Oct. 9, 1945.   W. T. CALDWELL   2,386,589
VALVE AND OPERATING MECHANISM THEREFOR
Filed March 19, 1942
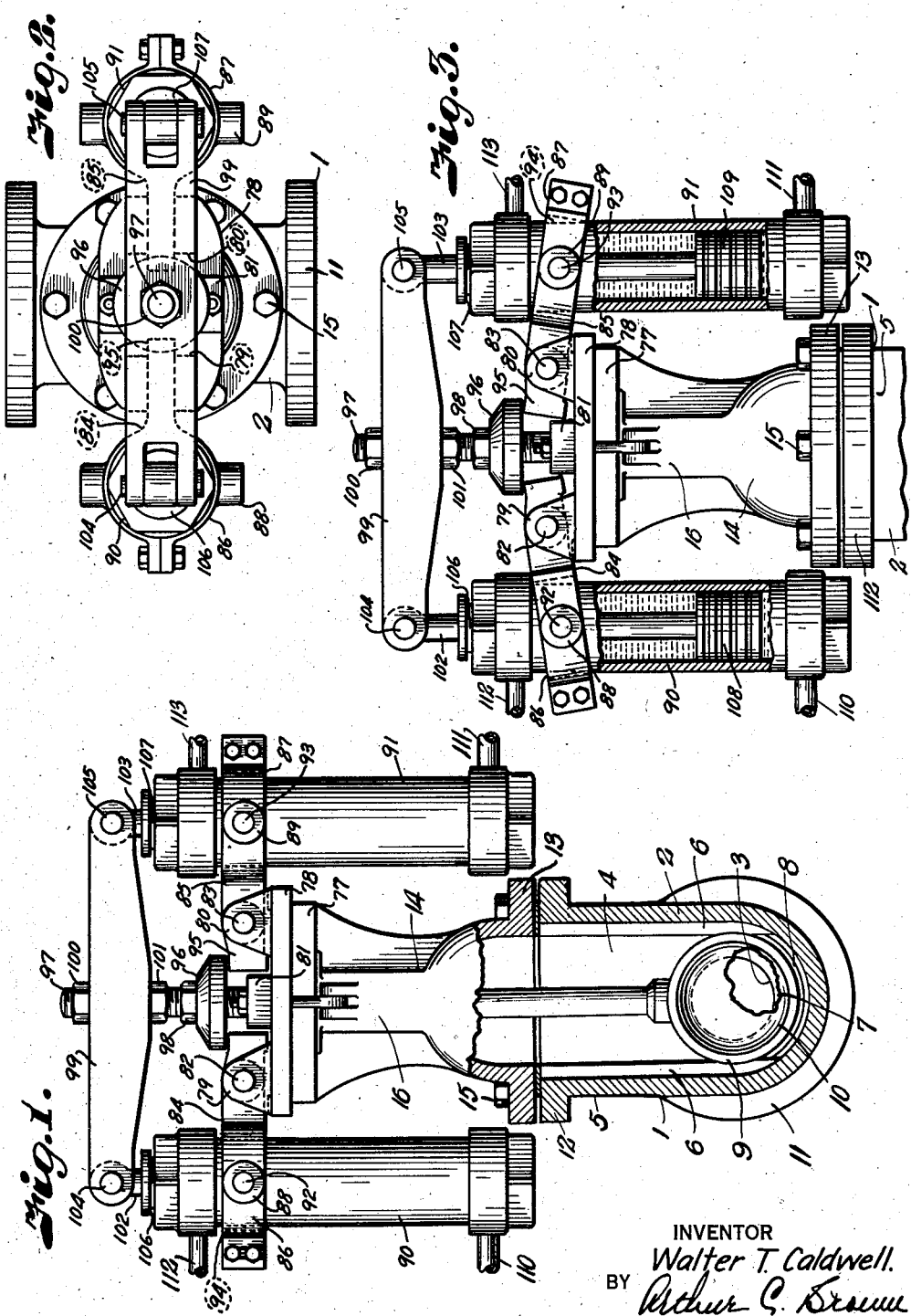
INVENTOR
Walter T. Caldwell.
BY
ATTORNEY Patented Oct. 9, 1945

2,386,589

UNITED STATES PATENT OFFICE 2,386,589

VALVE AND OPERATING MECHANISM THEREFOR

Walter T. Caldwell, Enid, Okla., assignor, by mesne assignments, to Valve Engineering Company, Enid, Okla., a corporation of Oklahoma Application March 19, 1942, Serial No. 435,305

8 Claims. (Cl. 137—139)

This invention relates to valves of the type usually known as gate valves, and has for its principal object to provide valves of this character with power actuating mechanism whereby they may be operated from a remote point.

Such valves usually consist of a body having a through passage for flow of fluid which is intercepted by a valving member consisting of a wedge-shaped disk or gate adapted to move transversely to and from wedging contact with opposed seating faces surrounding the flow passage. The seating faces are usually provided on ring inserts of bronze or other material to assure a leak-tight fit when the gate is closed. With this construction considerably more power is needed to unseat the valve than is required to complete the opening movement and effect subsequent closure thereof. Consequently it has been the practice to provide such valves with motive power sufficient to effect unseating of the gate and which power is applied throughout the opening and closing movement with the result that the valve is slow acting and the gate is driven into wedging contact with the seating faces with the same power necessary to effect the starting movement. If sufficient power is provided for higher speed operation the cost of operation increases and the surplus power over that required to complete the opening movement is destructive to the valve, particularly the seat rings thereof, for the reason that the gate is wedged too tightly and the seating faces gall and spring out of shape after a few operations so that the valve begins to leak.

It is, therefore, a purpose of the present invention to provide valves of this character with quick-acting mechanisms requiring relatively low operating power and which act in conjunction with a leverage connection with the gate to furnish sufficient starting power for unseating the gate and then quickly opening and closing the gate at a relatively high speed, thereby avoiding excessive wedging of the gate between its seating faces.

Further objects of the invention are to provide a power actuating mechanism adapted for efficient and simple remote control; to provide a power mechanism whereby movement of the valve is under control of the operator; to provide an actuating mechanism capable of application to any standard valve to form a compact unit without materially increasing the over-height of the valve; to provide an operating mechanism whereby the motive forces are applied directly at the valve; and to provide an operating mechanism capable of actuation while submerged in fluids and relatively inaccessible places.

In accomplishing these and other objects of the invention, I have provided improved structure, the preferred form of which is illustrated in the accompanying drawing, wherein:

Fig. 1 is an elevational view of a valve equipped with an operating mechanism embodying the features of the present invention.

Fig. 2 is a plan view of the valve and operating mechanism therefor.

Fig. 3 is a fragmentary view similar to Fig. 1 and showing the levers in valve opening position, portions of the hydraulic cylinders being broken away to better illustrate the interior thereof.

Referring more in detail to the drawing:

1 designates a valve of the gate type and which includes a body 2 having a flow passageway 3 therethrough intercepted by a transverse gate-receiving recess 4 extending upwardly into a laterally extending neck 5 of the valve body and which has opposite sides thereof provided with guides 6. The valve body is provided with seat rings 7 encircling the flow passage on opposite sides of the gate recess. The seat rings are disposed in the valve body so that the seating faces 8 thereof are located in planes converging downwardly to form a wedge contact with correspondingly disposed faces 9 on the gate or valving member 10, as in customary gate valve construction.

The body member of the valve is provided at the ends thereof with suitable means such as flanges 11 for connecting the valve into a pipe line (not shown) to selectively shut off flow of fluid therethrough. The neck 5 of the valve body is provided with a laterally extending annular flange 12 seating a similar flange 13 on a valve bonnet 14 that closes the open top of the gate-receiving recess and which is secured in position by fastening devices 15 extending through the respective flanges. The bonnet 14 includes an upwardly extending bracket having a tubular neck portion 16, carrying a plate 77.

The plate 77 mounts a plate 78 having pairs of ears 79 and 80 located on opposite sides of the packing gland 81 and which mount pivot pins 82 and 83 carrying rock levers 84 and 85. The outer ends of the levers carry bands 86 and 87 having bearings 88 and 89 in opposite sides with the axes thereof extending parallel with the axes of the pivot pins 82 and 83. Cylinders 90 and 91 depend through the bands 86 and 87 and are pivotally suspended therein by trunnions 92 and 93 projecting laterally from the sides of the cylinders and journalled in the bearings 88 and 89. The bands are of sufficient diameter to allow pivotal movement of the levers 84 and 85 relative to the cylinders as indicated by the dotted lines 94, Figs. 6 and 8. The opposite ends 95 of the levers 84 and 85 engage under a collar 96 that is threaded on the projecting end of the valve stem 97 and which is retained in an adjusted position relative to the ends 95 of the levers 84 and 85 by a jam-nut 98. The valve stem extends above the jam-nut 98 and carries a cross-arm 99 thereon, the cross-arm being adjustably connected with the stem by nuts 100 and 101 threaded on the stem and engaging the upper and lower sides of the arm, as shown in Figs. 1 and 3. The cross-arm is of sufficient length so that the ends project over the cylinders 90 and 91 and pivotally connect with piston rods 102 and 103 by pins 104 and 105. The rods extend into the cylinders 90 and 91 through packing glands 106 and 107, as in the first described form of the invention, and are connected with pistons 108 and 109 reciprocably mounted in the respective cylinders.

With this construction, when the gate 10 is closed and the parts of the actuating mechanism are in the position shown in Fig. 1, the gate is opened by admitting pressure medium to the lower ends of the cylinders through flexible ducts 110 and 111 and exhausting pressure medium above the pistons through flexible ducts 112 and 113 to effect downward movement of the cylinders and upward movement of the respective pistons 108 and 109. Downward movement of the cylinders causes the arms 84 and 85 to rock on the pins 82 and 83 so that the ends 95 exert a lifting or prying force on the valve stem to effect unseating of the gate. Upon further movement of the pistons the collar 96 being carried by the stem 97 moves away from the levers and the pistons lift the gate with only the force effected by the pressure medium. When the gate 10 is to be closed, fluid is exhausted from the lower ends of the cylinders and pressure fluid is admitted to the upper ends to effect upward movement of the cylinders on the pivots 82 and 83 limited by the rock levers and downward movement of the pistons therein carrying the cross-arm, valve stem, and gate therewith to closed position with the result that the gate is closed only under the force of the pressure medium. At the end of the stroke the collar 96 is positioned to be reengaged by the ends of the levers when pressure fluid is again admitted to the lower ends of the cylinders to open the gate.

From the foregoing it is obvious that I have provided a power actuated mechanism for gate valves whereby the motive force need be only that required to lift the gate under pressure of the fluid flowing through the valve and that the initial unseating force is effected through a leverage mechanism thereby furnishing sufficient power to effect unseating of the gate after which movement of the valve is readily effected through force of the pressure medium alone.

What I claim and desire to secure by Letters Patent is:

1. In a valve having a flow passageway, opposed seats surrounding the passageway, a gate adapted to wedgedly engage said seats, a stem connected with the gate, a cross-arm fixed to the stem, levers supported on the valve for limited pivotal movement, a lever engaging portions on the stem adapted to be engaged by the levers when the gate is in seat engaging position, cylinders carried by the levers, pistons slidable in the cylinders, means connecting the pistons with the cross-arm, and means supplying a pressure medium to the cylinders for effecting rocking movement of said levers to exert a prying force on said lever engaging portion and movement of the stem for unseating the gate.

2. In combination with a gate valve having a gate, a stem connected with the gate and a bonnet through which the stem projects, a power unit supported on said bonnet including cylinders levers supported on the bonnet for limited pivotal movement, cylinders suspended from said levers at the sides of said bonnet, pistons in the cylinders, means connecting the pistons with the stem, means for supplying pressure medium to said cylinders, and means on the stem adapted to be engaged by said levers when the gate closes flow through the valve to exert a prying force on said stem when pressure fluid is supplied to the cylinders.

3. In combination with a gate valve having a gate, a stem connected with the gate and a bonnet through which the stem projects, a power unit including a lever mounting supported on said bonnet, levers supported on said mounting and adapted for limited pivotal movement, a collar on the stem adapted to be engaged by said levers when the gate is in flow closing position, cylinders pivotally supported by the levers, pistons in the cylinders, means connecting the pistons with the stem, and means supplying a pressure fluid to said cylinders.

4. In combination with a valve having a bonnet, a gate for closing flow through the valve and a stem element connected with the gate, a unit actuating mechanism for the gate including a mounting element adapted for attachment to the bonnet, a pair of cylinder members, pistons slidable in the cylinder members, means for admitting pressure medium into the respective ends of the cylinder members for reciprocating the pistons, a pair of rod members connected with the pistons, a pair of levers, means pivotally connecting the levers with one pair of said members, means pivoting the levers on said mounting element, means rigidly connecting the other pair of members with said stem element, and means on the other element adapted to be engaged by said levers when the gate is in flow closing position for effecting an initially increased leverage on the stem element responsive to actuation of the pistons in said cylinder members to move the stem element in opening the gate.

5. In combination with a valve including a valve casing, a gate movable in the casing to and from a position closing flow through the casing element, a stem connected with the gate, an actuating mechanism for the gate including a pair of cylinder members, pistons slidable in the cylinder members, means for admitting pressure medium into the respective ends of the cylinder members for reciprocating the pistons, rods connected with the pistons, a pair of levers supported for limited pivotal movement by the valve, means pivotally suspending the cylinder members on the levers, and means on the stem adapted for engagement by said levers when the gate is in flow closing position to effect an increased leverage on the stem responsive to actuation of the pistons in said cylinder members.

6. An operating mechanism for a valving member of a valve including a cylinder, a piston movable in the cylinder responsive to a pressure medium admitted to one end of the cylinder, a lever, fulcrum means mounting the lever for limited pivotal movement on the valve, means for supporting the cylinder from one end of the lever, means for connecting the piston with the valving member, said lever having one end adapted for engagement with said connecting means during said limited movement of the lever when the pressure medium is admitted into the cylinder, and means for admitting pressure medium to the pressure cylinder.

7. An operating mechanism for the valving member of a valve wherein the valving member is movable in a body element of the valve by means of a stem element reciprocable in the body element of the valve, including a carrier adapted for attachment to the valve, a cylinder, means mounting the cylinder on the carrier for limited pivotal movement, a piston movable in the cylinder, means for connecting the piston with the stem element, and means for transmitting said movement of the cylinder upon said stem to initially supplement movement of the stem by said piston through said connecting means.

8. An operating mechanism for the valving member of a valve wherein the valving member is movable by means of a stem element reciprocable in a body element of the valve, a plurality of levers, means for pivotally supporting the levers on one of said elements of the valve for limited pivotal movement relatively to said body element and to each other, said levers being adapted to be substantially symmetrically arranged relatively to the stem of said valve and having ends adapted to engage the other valve element, power exerting means related to each lever including a cylinder and a piston movable in the cylinder responsive to pressure fluid admitted to the power exerting means, means pivotally supporting the cylinders on the other ends of the levers, means for connecting the pistons with said stem element, and means for admitting the pressure medium to said pressure exerting means to effect substantially simultaneous actuation of said levers for exerting an initial moving force upon the stem by said symmetrically arranged levers for effecting unseating of the valving-member.

WALTER T. CALDWELL.